(12) United States Patent
Isaksen et al.

(10) Patent No.: US 7,079,605 B1
(45) Date of Patent: Jul. 18, 2006

(54) FREQUENCY ESTIMATION BASED ON CONSTELLATION ERROR IN QAM MODEMS

(75) Inventors: David Bruce Isaksen, Mountain View, CA (US); Byron Esten Danzer, Aptos, CA (US)

(73) Assignee: Wideband Semiconductors, Inc., Mountain View, CA (US)

( * ) Notice: Subject to any disclaimer, the term of this patent is extended or adjusted under 35 U.S.C. 154(b) by 992 days.

(21) Appl. No.: 10/134,224

(22) Filed: Apr. 25, 2002

(51) Int. Cl.
*H04L 27/06* (2006.01)
*H03D 3/00* (2006.01)

(52) U.S. Cl. ............................. 375/344; 375/322
(58) Field of Classification Search ............ 375/344, 375/322
See application file for complete search history.

(56) References Cited

U.S. PATENT DOCUMENTS

| | | | |
|---|---|---|---|
| 5,309,481 A * | 5/1994 | Viviano et al. | 375/344 |
| 5,940,450 A | 8/1999 | Koslov et al. | |
| 6,041,085 A * | 3/2000 | Anzai | 375/326 |
| 6,603,821 B1 * | 8/2003 | Doi | 375/326 |
| 6,882,691 B1 * | 4/2005 | Chiodini | 375/326 |
| 2001/0017896 A1 * | 8/2001 | Murakami et al. | 375/260 |

* cited by examiner

*Primary Examiner*—Kevin Kim
(74) *Attorney, Agent, or Firm*—Boris G. Tankhilevich

(57) ABSTRACT

A method for frequency estimation in a QAM modem comprising the following steps: (1) receiving inphase and quadrature components of a QAM symbol from a carrier recovery block; (2) mapping received QAM symbol to a nearest QAM plant point using a slicer; (3) determining an instant error power of the received QAM point; (4) averaging the instant error power over a plurality of incoming QAM symbols in time domain; (5) excluding a DC component from the averaged error power; (6) translating the averaged error power without DC component from time domain into a frequency domain in order to determine the frequency spectrum of the averaged error power; (7) selecting the frequency spectrum component of the averaged error power with the maximum amplitude by using a peak detection; and (8) determining the frequency offset as the maximum frequency spectrum component of the averaged error power.

28 Claims, 4 Drawing Sheets

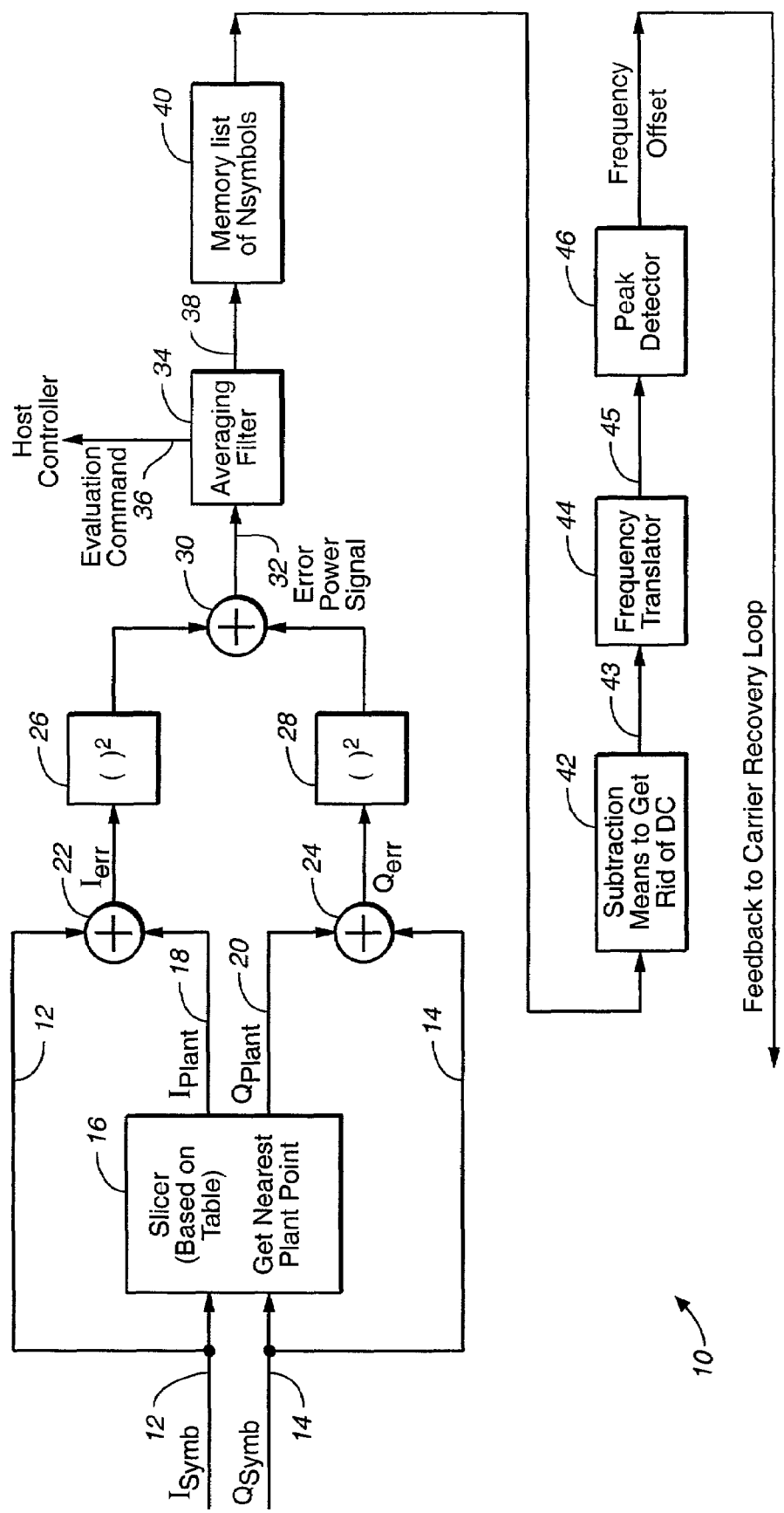
FIG._1

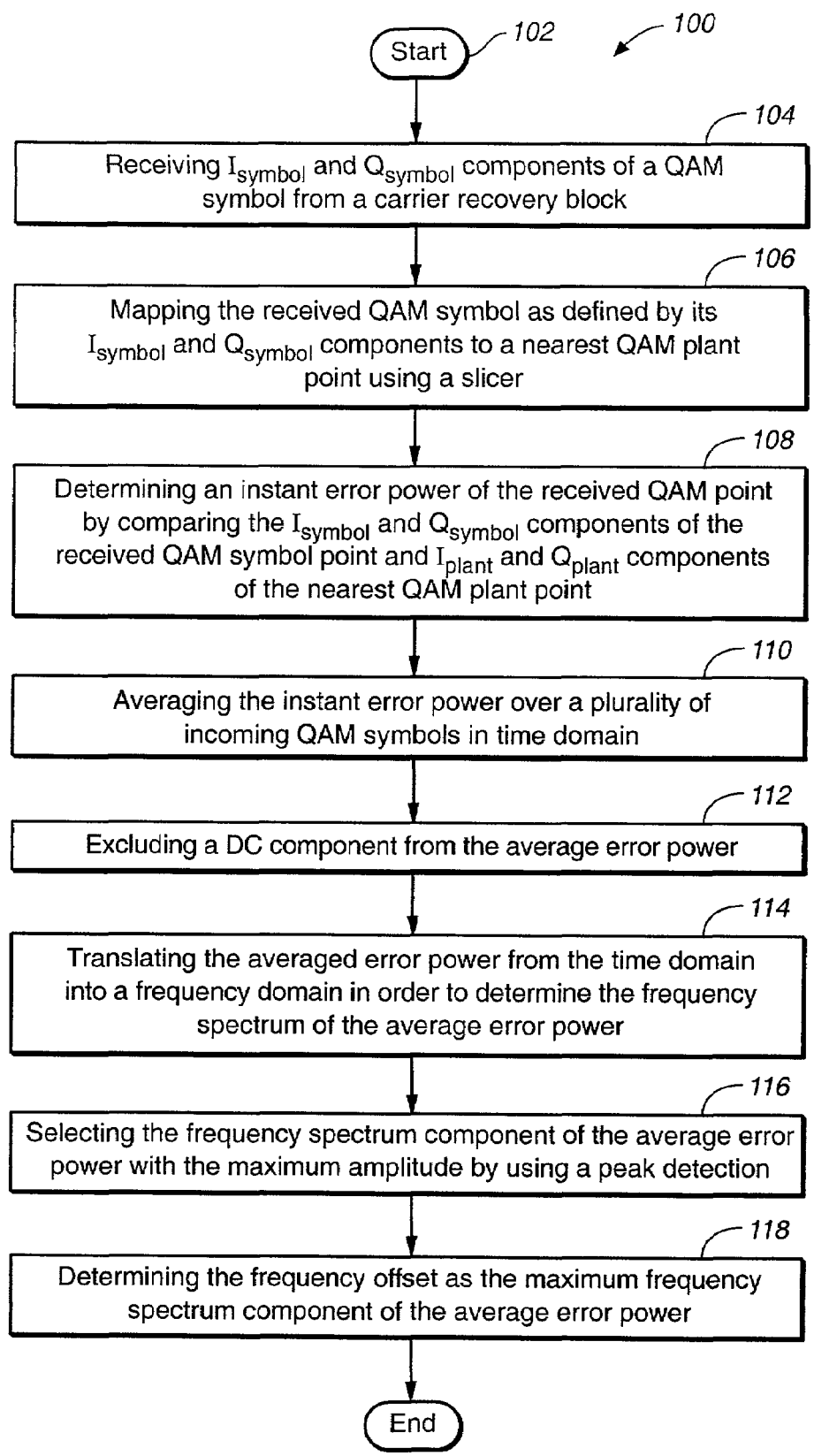
FIG._2

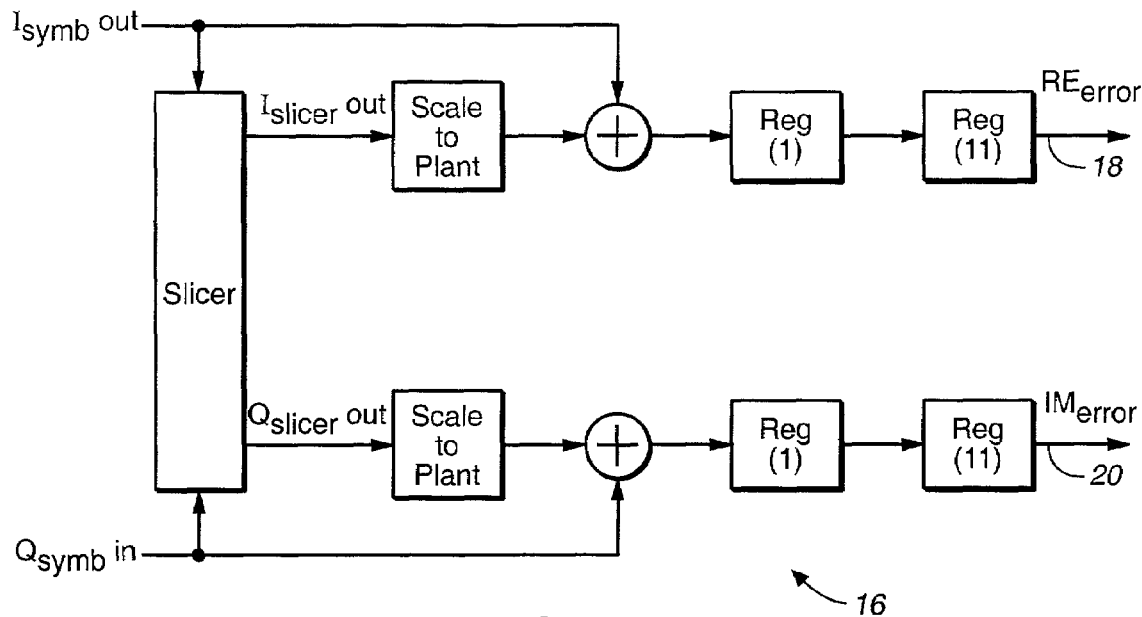
FIG._3
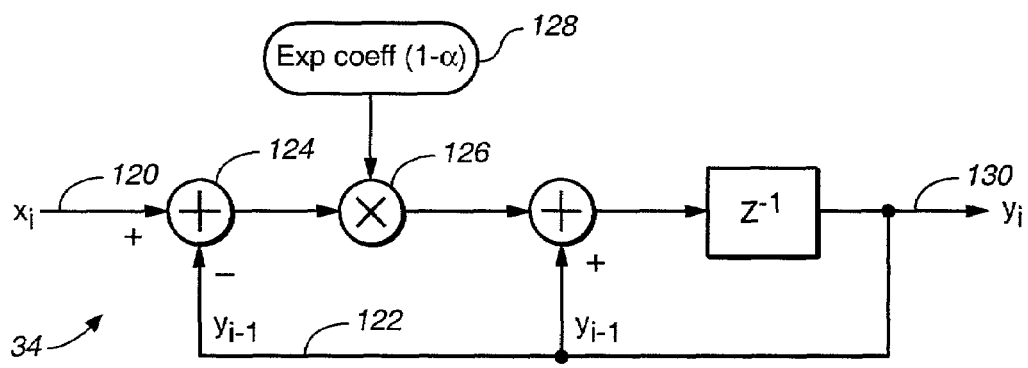
$\alpha = 1 \rightarrow$ Instant $\rightarrow$ No Filter $\rightarrow$ BW $\rightarrow \infty$
$\alpha = 0 \rightarrow$ Hold $\rightarrow$ BW $\rightarrow 0$
$\alpha = 0.5 \rightarrow$ Half Life $\rightarrow$ BW $\infty$ 0
Digital Exponential Averaging Filter
$X_i (1 - \alpha) - y_{i-1}(1-\alpha) + y_{i-1} = y_i$
$X_i (1 - \alpha) - \cancel{y_{i-1}} + y_{i-1}\alpha + \cancel{y_{i-1}} = y_i$
FIG._4

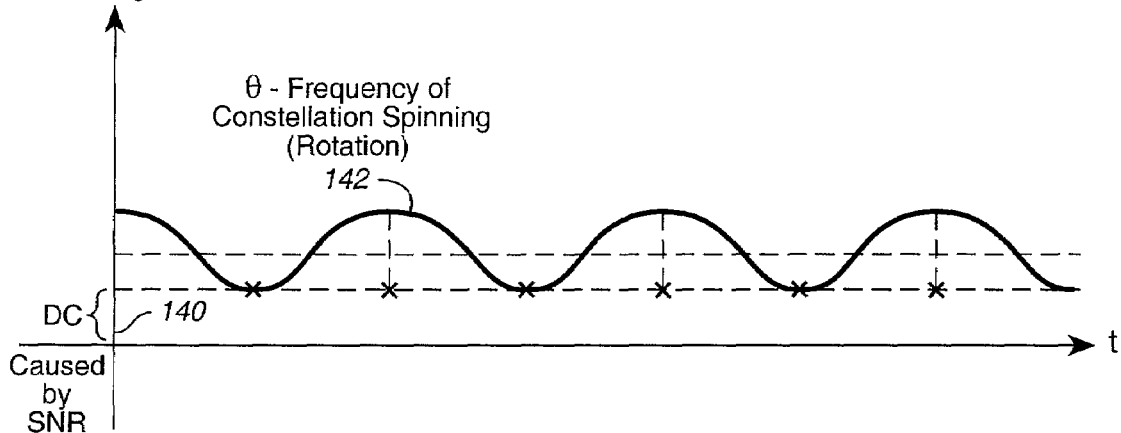
FIG._5
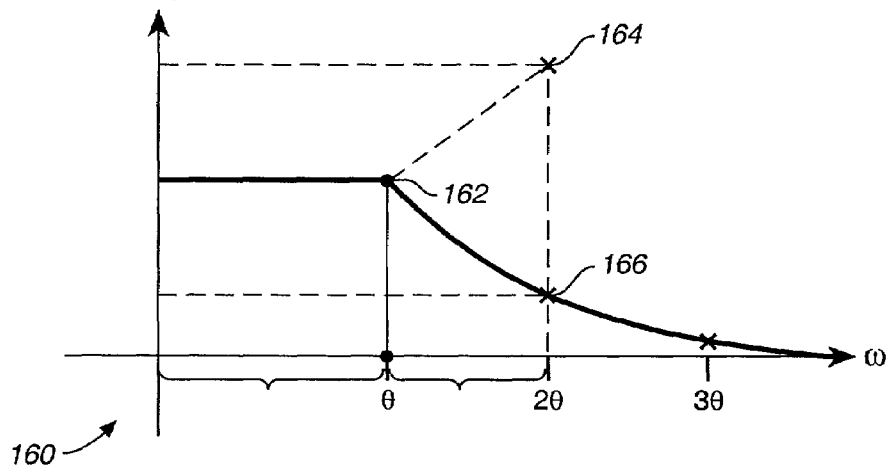
FIG._6

FREQUENCY ESTIMATION BASED ON CONSTELLATION ERROR IN QAM MODEMS

BACKGROUND OF THE INVENTION

1. Field of the Invention

The present invention relates to the filed of the digital signal processing, and more specifically, to the field of QAM modems.

2. Discussion of the Prior Art

When the communication exists for a long period of time, it is possible to use a conventional phase-lock loop (PLL) in a receiver to recover the carrier from a continuously transmitted signal. The PLL that is specifically designed to recover the carrier is termed as a phase carrier loop.

However, in a time-division multiple access (TDMA) communication system, or in any other communication system that requires a rapid carrier acquisition, the available spectrum is used by letting each user to have access to the whole band for a short time (traffic burst), during which time the user transmits data as fast as the user can. The user's frequency allocation is shared with the other users who have time slots allocated at other times.

Thus, in a TDMA-type burst communication systems, or in any other communication system that requires a rapid carrier acquisition, the signals exist for a short period of time. Consequently, there is a need to quickly determine the carrier frequency offset during a net entry time period. The recovered frequency offset allows one to increase the speed of locking the tracking loop onto the incoming burst carrier signal.

What is needed is to design a QAM carrier tracking loop system that is capable of quickly determining the carrier frequency offset during the net entry time period, and to utilize the recovered frequency offset in order to increase the speed of locking the carrier tracking loop onto the incoming burst carrier signal.

SUMMARY OF THE INVENTION

To address the shortcomings of the available art, the present invention provides a method and apparatus for QAM carrier tracking loop system that is capable of quickly determining the carrier frequency offset during the net entry time period, and to utilize the recovered frequency offset in order to increase the speed of locking the carrier tracking loop onto the incoming burst carrier signal.

One aspect of the present invention is directed to a method for frequency estimation in a QAM modem comprising the following steps: (1) receiving $I_{symbol}$ and $Q_{symbol}$ components of a QAM symbol from a carrier recovery block; (2) mapping the received QAM symbol as defined by its $I_{symbol}$ and $Q_{symbol}$ symbol components to a nearest QAM plant point using a slicer; (3) determining an instant error power of the received QAM point by comparing the $I_{symbol}$ and $Q_{symbol}$ components of the received QAM symbol point and $I_{plant}$ and $Q_{plant}$ components of the nearest QAM plant point; (4) averaging the instant error power over a plurality of incoming QAM symbols in time domain; (5) excluding a DC component of the averaged error power; (6) translating the averaged error power without the DC component from the time domain into a frequency domain in order to determine the frequency spectrum of the averaged error power; (7) selecting the frequency spectrum component of the averaged error power with the maximum amplitude by using a peak detection; and (8) determining the frequency offset as the maximum frequency spectrum power component of the averaged error power.

In one embodiment of the present invention, the step of averaging the instant error power over the plurality of incoming QAM symbols in time domain further includes the step of using a digital infinite impulse response (IIR) filter. In another embodiment of the present invention, the step of averaging the instant error power over the plurality of incoming QAM symbols in time domain further includes the step of using a digital low pass filter (LPF). In one more embodiment of the present invention, the step of averaging the instant error power over the plurality of incoming QAM symbols in time domain further includes the step of using a digital finite impulse response filter (FIR).

In one embodiment of the present invention, the step of using the digital infinite impulse response (IIR) filter in order to average the instant error power over the plurality of incoming QAM symbols in time domain further includes the step of using a digital exponential averaging filter.

In one embodiment of the present invention, the step of using the digital finite impulse response filter (FIR) in order to average the instant error power over the plurality of incoming QAM symbols in time domain further includes the step of using a moving averaging filter of length N, wherein N is a number of received symbols selected for averaging purposes, N is an integer.

In one embodiment of the present invention, the moving averaging filter is configured to use the sequence $\alpha_N$ of N symbols for averaging purposes. In one embodiment, a sequence $\alpha_{N\_Last}$ of last received N symbols is used for averaging purposes. In another embodiment, a decimated sequence $\alpha_{N,k,R\ Decimated}$ of received N symbols is selected for averaging purposes, wherein the decimated sequence $\alpha_{N,k,R\ Decimated}$ includes a sequence of N symbols selected in the following order: {"k"-th incoming symbol, "k+R"-th incoming symbol, "k+2R"-th incoming symbol, . . . , "k+(N−1)*R"-th incoming symbol}; wherein "k" is an integer less than N; and wherein a decimation rate "R" is an integer less than N.

In one embodiment of the present invention, the step of translating the averaged error power without the DC component from the time domain into the frequency domain in order to determine the frequency spectrum of the averaged error power further includes the step of using a Fast Fourier Transform (FFT). In another embodiment of the present invention, the step of translating the averaged error power without the DC component from the time domain into the frequency domain in order to determine the frequency spectrum of the averaged error power further includes the step of using a Discrete Fourier Transform (DFT). Yet, in one additional embodiment of the present invention, the step of translating the averaged error power without the DC component from the time domain into the frequency domain in order to determine the frequency spectrum of the averaged error power further includes the step of using a wavelet transform.

BRIEF DESCRIPTION OF DRAWINGS

The aforementioned advantages of the present invention as well as additional advantages thereof will be more clearly understood hereinafter as a result of a detailed description of a preferred embodiment of the invention when taken in conjunction with the following drawings.

FIG. 1 depicts a block-diagram of the apparatus for frequency estimation in a QAM modem of the present invention.

FIG. 2 is a flow chart of the method of the present invention for frequency estimation in a QAM modem.

FIG. 3 shows the computation of the DDE error from the symbol output.

FIG. 4 depicts the averaging block of FIG. 1 being implemented using a digital exponential averaging filter.

FIG. 5 illustrates the QAM constellation rotating with a 0-frequency, and the averaged error power signal having in first approximation a non-zero DC component, and a single θ-frequency component.

FIG. 6 depicts an example of application of FFT block to the signal representing <Averaged_Error_Power_Samples—DC component$_{averaged\ over\ the\ memory\ list}$>, which translates this signal into the averaged error power signal in the frequency domain.

DETAILED DESCRIPTION OF THE PREFERRED AND ALTERNATIVE EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

FIG. 1 depicts a block-diagram 10 of the apparatus for frequency estimation in a QAM modem of the present invention. In the U.S. patent application "Linear Phase Robust Carrier Recovery for QAM Modems" by the inventors David Isaksen and Byron Danzer, Ser. No. 09/981,085, filed on Oct. 16, 2001, and incorporated by reference herein in its entirety, a method of carrier tracking in a QAM demodulator including an adaptive equalizer was disclosed. The above referenced patent application "Linear Phase Robust Carrier Recovery for QAM Modems" is referred to hereafter as the patent application #1. The patent application #1 disclosed the following steps performed by the tracking loop (not shown): (A) sampling a QAM signal received from a transmission channel; (B) recovering a symbol clock function from the sampled QAM signal; and (C) applying the sampled QAM signal to the adaptive equalizer in order to obtain a QAM equalized signal in a Blind Equalization (BE) mode. These steps have to be performed before the apparatus 10 (of FIG. 1) of the present invention performs the steps of the method of the present invention, as fully disclosed below.

In one embodiment of the present invention, the apparatus 10 receives $I_{symbol}$ 12 and $Q_{symbol}$ 14 components of a QAM symbol from the carrier recovery block of the patent application #1 (not shown).

In one embodiment of the present invention, FIG. 2 illustrates a flow chart 100 of the method of the present invention for frequency estimation in a QAM modem. Thus, the first step 104 (of FIG. 2) of receiving $I_{symbol}$ and $Q_{symbol}$ components of a QAM symbol from a carrier recovery block is performed by the receiving means (not shown) of the apparatus 10 of FIG. 1.

The next step 106 (of FIG. 2) is the step of mapping the received QAM symbol as defined by its $I_{symbol}$ and $Q_{symbol}$ symbol components to a nearest QAM plant point of the received QAM constellation. It is assumed, that the particular QAM constellation that is employed by the transmitting end of the QAM modem is known by the receiving end of the QAM modem at the time of reception of the QAM symbol.

In one embodiment of the present invention, the step 106 is performed by using a slicer 16 of FIG. 1. To calculate the direction of the error signal one needs to use a slicer in order to locate a plant point (corresponding to the sent signal) that is nearest to the received signal. This is a "hard decision" approach. The slicer 16 of FIG. 1 (also shown in more details in FIG. 3) is configured to locate a nearest plant point for the QAM Blind equalized signal for each recovered symbol clock. Thus, the inphase slicer output 18 and the quadrature slicer output 20 are I and Q components (correspondingly) of a plant point that is nearest to the actual received QAM symbol.

In another embodiment of the present invention, one can use a Viterbi decoder (not shown) without using a slicer to determine the direction of the error signal. This is a soft decision approach that requires that the patent application #1 includes a carrier loop with even more latency than the latency of a carrier loop in the "hard decision" approach.

In one embodiment of the present invention, the slicer 16 is implemented by using the Application Specific Integrated Circuit (ASIC). In another embodiment of the present invention, the slicer 16 (of FIG. 1) is implemented by using a lookup table (not shown) that for the predetermined QAM constellation for each incoming QAM symbol selects the nearest plant point depending on the I and Q components of the incoming QAM symbol. In this embodiment, the slicer 16 is implemented by using a general purpose computer loaded with a computer program that implements the lookup table.

Referring still to FIG. 3, in one embodiment of the present invention, at the next step 108, an instant error power of the received QAM point is determined by comparing the $I_{symbol}$ 12 and $Q_{symbol}$ 14 components of the received QAM symbol point and $I_{plant}$ 18 and $Q_{plant}$ 20 components of the nearest QAM plant point. In one embodiment of the present invention, the substracter block 22 determines the amplitude of the error signal in the inphase channel:

$$|I_{symbol} - I_{plant}|; \quad (1)$$

wherein the substracter block 24 determines the amplitude of the error signal in the quadrature channel:

$$|Q_{symbol} - Q_{plant}|. \quad (2)$$

The square blocks 26 and 28, and the adder block 30 of FIG. 1 allows one to determine the instant error power signal 32 as follows:

$$\text{Instant Error Power} = (I_{symbol} - I_{plant})^2 + (Q_{symbol} - Q_{plant})^2. \quad (3)$$

Referring still to FIG. 2, in one embodiment of the present invention, at the next step 110, the instant error power 32 (of FIG. 1) is averaged over a plurality of incoming QAM symbols in time domain. In one embodiment of the present invention, the averaging filter block 34 is implemented using a digital low pass filter (LPF) (not shown). In one embodiment of the present invention, the averaging filter block 34 is implemented using a digital low pass filter (LPF) further including a digital infinite impulse response (IIR) filter (not shown). The IIR filter can be implemented by using a direct form transfer function, a cascade form transfer function, or a parallel form transfer function.

In one embodiment of the present invention, the averaging filter block 34 is implemented using a digital infinite impulse response (IIR) filter further including a digital exponential averaging filter, as depicted in FIG. 4. In this embodiment, by selecting the exponential coefficient 128 as $(1-\alpha)$, the digital exponential averaging filter 34 has the following form:

$$y(i)=(1-\alpha)x(i)+\alpha y(i-1). \qquad (4)$$

If $\alpha=1$, the filtering is instant, which means that actually no filtering takes place, and the bandwidth (BW) of the averaging filter block 34 goes to infinity:

$$BW \to \infty. \qquad (5)$$

If $\alpha=0$, the signal does not propagate through the exponential filter, which means that the bandwidth (BW) of the averaging filter 34 goes to zero:

$$BW=0. \qquad (6)$$

If $0<\alpha<1$, the exponential filter has a non-zero bandwidth $$BW \ne 0 \qquad (7)$$

and implements the low pass filter that is configured to filter out the high frequency component of the Instant Error Power Eq. (3) that are caused only by noise.

In one embodiment of the present invention, the digital exponential averaging filter 34 is implemented by using the Application Specific Integrated Circuit (ASIC). In another embodiment of the present invention, the digital exponential averaging filter 34 is implemented by using a general purpose computer loaded with a computer program that implements the algorithm of Eq. (4).

In one embodiment, the averaging filter block 34 is implemented using a digital LPF filter further including a digital finite impulse response filter (FIR). The FIR filter can be implemented by employing a direct form transfer function, a cascade form transfer function, or a parallel form transfer function.

In one embodiment of the present invention, the averaging filter block 34 is implemented by using a FIR filter further including a moving averaging filter of length N (not shown), wherein N is a number of received symbols selected for averaging purposes, N is an integer. In one embodiment, a sequence $\alpha_N$ of N symbols selected for averaging purposes comprises a sequence $\alpha_{N\_Last}$ of last received N symbols. In one embodiment, the error power signal 32 is averaged over the plurality of last N received QAM symbols, N is an integer, by using the moving averaging filter 34 (of FIG. 1) after receiving an evaluation command 36 from a host controller (not shown). In one embodiment, N is in the range of (8–30) symbols. When the QAM symbol is locked to the plant point, the averaging filter output is zero.

In another embodiment of the present invention, a sequence $\alpha_N$ of N symbols selected for averaging purposes comprises a decimated sequence $\alpha_{N,k,R\ Decimated}$ of received N symbols, wherein the decimated sequence $\alpha_{N,k,R\ Decimated}$ includes a sequence of N symbols selected in the following order: {"k"-th incoming symbol, "k+R"-th incoming symbol, "k+2R"-th incoming symbol, "k+(N−1)*R"-th incoming symbol}; wherein "k" is an integer less than N; and wherein the decimation rate "R" is an integer less than N. The decimation filter has a lower BW as compared with the BW of the averaging filter that uses a sequence $\alpha_{N\_Last}$ of last received N symbols for averaging purposes. Therefore, the decimated filter is useful for the carrier tracking loop having a low frequency offset. Thus, the decimation filter has a narrower BW as compared with the BW of the averaging filter that uses the last N symbols for averaging purposes.

In general, the averaged error power signal 38 can be expressed as follows:

$$\text{Averaged\_Error\_Power}=<(I_{symbol}-I_{plant})^2+(Q_{symbol}-Q_{plant})^2>. \qquad (8)$$

As depicted in FIG. 5 in the time domain, in one embodiment of the present invention, if the QAM constellation rotates with a $\theta$-frequency, the averaged error power signal 38 (Averaged_Error_Power of Eq. (8)) has a non-zero DC component 140, and in first approximation, also a single $\theta$-frequency component.

In one embodiment, the non-zero DC component 140 of the Averaged_Error_Power signal is caused by the signal-to-noise ratio (SNR) that is greater than the predetermined minimum detectable $SNR_{min}$:

$$SNR > SNR_{min}, \qquad (9)$$

which means that the signal is higher than the minimum detectable signal.

Referring still to FIG. 2, in order to make a frequency translation of the averaged error power signal by using a frequency translation block 44, it is desirable to make a preliminary step 112 of excluding the DC component 140 (of FIG. 5) from the averaged error power. In one embodiment of the present invention, when the averaging filter 34 is implemented by using the N moving averaging filter, the step 112 can be performed by using the block 40 that includes the memory list of N incoming QAM symbols that were used for averaging purposes in the moving averaging filter 34. In one embodiment, the memory list 40 includes the N last symbols, if the moving averaging filter utilized the N last symbols for averaging purposes. In another embodiment of the present invention, if the averaging filter 34 is implemented by using a decimation filter, the memory list 40 includes N symbols selected according to the following algorithm:

{"k"-th incoming symbol, "k+R"-th incoming symbol, "k+2R"-th incoming symbol, . . . , "k+(N−1)*R"-th incoming symbol}; wherein "k" is an integer less than N; and wherein the decimation rate "R" is an integer less than N. (10)

In addition to the memory list 40, the step 112 of excluding the DC component of the averaged error power is performed by using the subtracting means 42 (of FIG. 1). More specifically, the memory list allows one to calculate the DC component of the averaged error power, and the subtracting means allows one to subtract the DC component averaged over the memory list from the plurality of the averaged error power samples. It follows, that the signal 43 (of FIG. 1) is as follows:

$$<\text{Averaged\_Error\_Power\_Samples} - \text{DC component}_{averaged\ over\ the\ memory\ list}>. \qquad (11)$$

Referring still to FIG. 2, the next step 114 is the step of translating the averaged error power without the DC component, or $<\text{Averaged\_Error\_Power\_Samples} - \text{DC component}_{averaged\ over\ the\ memory\ list}>$ of Eq. (1 µl), from the time domain into a frequency domain in order to determine the frequency spectrum of the averaged error power without the DC component.

In one embodiment of the present invention, step 114 is performed by using a frequency translation block 44 (of FIG. 1). In one embodiment, the frequency translation block 44 (of FIG. 1) further includes a Fourier Transform (FT) algorithm.

The definition of a Fourier Transform differs depending on the signal type. In general, Fourier Transform is a means of mapping a signal defined in a time domain into another signal in a frequency domain. If the frequency spectrum is continuous, the Fourier Transform comprises a continuous Fourier Transform. If, on the other hand, the frequency spectrum is discrete, the Fourier Transform comprises a discrete Fourier Transform (DFT).

In the brute force calculations, the program has to perform the $N^2$ multiply/adds to perform the entire transform, wherein N is the number of discrete frequency points in the signal. For instance, for N=10,000, the brute force calculations require the unreasonable amount of time and computing power.

The Fast Fourier Transform (FFT) uses the structure of the definition of the DFT to take many shortcuts in order to compute the Fourier coefficients by using only N*log[N] of computations. By cutting from $N^2$ to N*log[N] the number of computations necessary to compute a Fourier transform, the Fast Fourier Transform (FFT) allows one to make fast calculation of the Fourier coefficients.

In one embodiment, the frequency translation block 44 (of FIG. 1) further includes a Fast Fourier Transform (FFT).

In one embodiment, the frequency translation block 44 (of FIG. 1) further includes a wavelet transform block. A wavelet transform is a form of orthonormal transform with specific properties. A key idea is to construct all of the basis functions from a single continuous time signal called a wavelet. These signals are all formed by dilations and shifts of the basic function. The wavelet transform provides a convenient multi resolution reconstruction of the original signal. A Fourier series representation gives an increasingly accurate approximation to the original signal as one adds up the terms of the sum. A wavelet reconstruction does this in a particular useful way, providing progressively better approximations. The wavelet transform is also of interest because many of the signals used in the decomposition have short duration, which is in obvious contrast to the complex exponential, which are no zero over almost the entire time domain. This means that error in wavelet coefficients will usually have effects that are highly localized and not spread out over the full domain. Wavelets also have big advantage of simple and fast algorithms for their computations. By an iteration involving separate pairwise sums and differences, the coefficients are built up in a sequence of simple combinations. Each of these operations can be viewed as a linear filtering, and the overall operation can be constructed using a cascade of filters and subsampling operations, a form of subband filtering.

In one embodiment, the frequency translation block 44 is implemented by using the Application Specific Integrated Circuit (ASIC). In another embodiment of the present invention, the frequency translation block 44 is implemented by using a general purpose computer loaded with a computer program that implements FFT algorithm, or the wavelet subband filtering algorithm.

FIG. 6 illustrates an example of application of FFT block 44 to the signal 43 representing <Averaged_Error_Power _Samples—DC component$_{averaged\ over\ the\ memory\ list}$>, which translates signal 43 into the averaged error power signal in the frequency domain. According to FIG. 6, the averaged error power signal in the frequency domain 45 can include several frequency points including 162 (at θ-frequency), 164 (at 2θ-frequency and high SNR), or 166 (2θ-frequency and low SNR). The SNR can be independently measured (block SNR measurement is not shown) before block 44 and just after the averaging filter block 34, so that the ambiguity between points 164 and 166 can be resolved based on measured SNR. If SNR is relatively low, the higher the frequency, the more it is attenuated. Thus, for lower measured SNR, the point 166 (2θ-frequency and low SNR) is considered to be a more probable result, than the point 164 (2θ-frequency and high SNR).

Referring still to FIG. 2, at step 116, in one embodiment of the present invention, the frequency spectrum component of the averaged error power with the maximum amplitude is selected by using a peak detector. In one embodiment, this step is performed by using a peak detector block 46 (of FIG. 1). In one embodiment, the maximum likelihood peak detector is used to implement the block 46.

Finally, in one embodiment of the present invention the step 118 of determining the frequency offset as the maximum frequency spectrum component of the averaged error power is performed by using an algorithm configured to determine the frequency offset by selecting the residual maximum frequency component (not shown). The estimated frequency offset is fed back into the carrier tracking loop of the patent application # 1 in order to improve the performance of the down conversion loop, and to increase the speed of locking of the carrier tracking loop on the carrier signal.

The foregoing description of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for frequency estimation in a QAM modem comprising the steps of:

receiving $I_{symbol}$ and $Q_{symbol}$ components of a QAM symbol from a carrier recovery block;

mapping said received QAM symbol as defined by its $I_{symbol}$ and $Q_{symbol}$ symbol components to a nearest QAM plant point using a slicer;

determining an instant error power of said received QAM point by comparing said $I_{symbol}$ and $Q_{symbol}$ components of said received QAM symbol point and $I_{plant}$ and $Q_{plant}$ components of said nearest QAM plant point;

averaging said instant error power over a plurality of incoming QAM symbols in time domain;

excluding a DC component from said averaged error power;

translating said averaged error power without said DC component from said time domain into a frequency domain in order to determine the frequency spectrum of said averaged error power;

selecting the frequency spectrum component of said averaged error power with the maximum amplitude by using a peak detection;
and
determining said frequency offset as said maximum frequency spectrum component of said averaged error power.

2. The method of claim 1, wherein said step of averaging said instant error power over said plurality of incoming QAM symbols in time domain further includes the step of:
using a digital infinite impulse response (IIR) filter.

3. The method of claim 2, wherein said step of using said digital infinite impulse response (IIR) filter in order to average said instant error power over said plurality of incoming QAM symbols in time domain further includes the step of:
using a digital exponential averaging filter.

4. The method of claim 1, wherein said step of averaging said instant error power over said plurality of incoming QAM symbols in time domain further includes the step of:
using a digital low pass filter (LPF).

5. The method of claim 1, wherein said step of averaging said instant error power over said plurality of incoming QAM symbols in time domain further includes the step of:
using a digital finite impulse response filter (FIR).

6. The method of claim 5, wherein said step of using said digital finite impulse response filter (FIR) in order to average said instant error power over said plurality of incoming QAM symbols in time domain further includes the step of:
using a moving averaging filter of length N, wherein N is a number of received symbols selected for averaging purposes, N is an integer.

7. The method of claim 6 further including the step of:
selecting a sequence $\alpha_N$ of N symbols, wherein said moving averaging filter is configured to use said sequence $\alpha_N$ of N symbols for averaging purposes.

8. The method of claim 7, wherein said step of selecting said sequence $\alpha_N$ of N symbols for averaging purposes further includes the step of:
selecting a sequence $\alpha_{N\_Last}$ of last received N symbols for averaging purposes.

9. The method of claim 7, wherein said step of selecting said sequence $\alpha_N$ of N symbols for averaging purposes further includes the step of:
selecting a decimated sequence $\alpha_{N,k,R\ Decimated}$ of received N symbols for averaging purposes, wherein said decimated sequence $\alpha_{N,k,R\ Decimated}$ includes a sequence of N symbols selected in the following order: {"k"-th incoming symbol, "k+R"-th incoming symbol, "k+2R"-th incoming symbol, . . . , "k+(N−1)* R"-th incoming symbol}; wherein "k" is an integer less than N; and wherein a decimation rate "R" is an integer less than N.

10. The method of claim 1, wherein said step of translating said averaged error power without said DC component from said time domain into said frequency domain in order to determine the frequency spectrum of said averaged error power further includes the step of:
using a Fast Fourier Transform (FFT).

11. The method of claim 1, wherein said step of translating said averaged error power without said DC component from said time domain into said frequency domain in order to determine the frequency spectrum of said averaged error power further includes the step of:
using a Discrete Fourier Transform (DFT).

12. The method of claim 1, wherein said step of translating said averaged error power without said DC component from said time domain into said frequency domain in order to determine the frequency spectrum of said averaged error power further includes the step of:
using a wavelet transform.

13. The method of claim 1, wherein said step of averaging said instant error power over said plurality of incoming QAM symbols in time domain further includes the step of:
measuring signal-to-noise ratio (SNR) by using said averaged error power and by using an averaged predetermined QAM constellation power.

14. An apparatus for frequency estimation in a QAM modem comprising:
a means for receiving $I_{symbol}$ and $Q_{symbol}$ components of a QAM symbol from a carrier recovery block;
a means for mapping said received QAM symbol as defined by its $I_{symbol}$ and $Q_{symbol}$ symbol components to a nearest QAM plant point using a slicer;
a means for determining an instant error power of said received QAM point;
a means for averaging said instant error power over a plurality of incoming QAM symbols in time domain;
a means for excluding a DC component from said averaged error power;
a means for translating said averaged error power without said DC component from said time domain into a frequency domain in order to determine the frequency spectrum of said averaged error power;
a means for selecting the frequency spectrum component of said averaged error power with the maximum amplitude;
and
a means for determining said frequency offset as said maximum frequency spectrum component of said averaged error power.

15. The apparatus of claim 14, wherein said means for mapping said received QAM symbol as defined by its $I_{symbol}$ and $Q_{symbol}$ symbol components to a nearest QAM plant point further includes:
a slicer.

16. The apparatus of claim 14, wherein said means for determining an instant error power of said received QAM point further includes:
a means for comparing said $I_{symbol}$ and $Q_{symbol}$ components of said received QAM symbol point and $I_{plant}$ and $Q_{plant}$ components of said nearest QAM plant point.

17. The apparatus of claim 14, wherein said means for averaging said instant error power over said plurality of incoming QAM symbols in time domain further includes:
a digital infinite impulse response (IIR) filter.

18. The apparatus of claim 14, wherein said means for averaging said instant error power over said plurality of incoming QAM symbols in time domain further includes:
a digital exponential averaging filter.

19. The apparatus of claim 14, wherein said means for averaging said instant error power over said plurality of incoming QAM symbols in time domain further includes:
a digital low pass filter (LPF).

20. The apparatus of claim 14, wherein said means for averaging said instant error power over said plurality of incoming QAM symbols in time domain further includes:
a digital finite impulse response filter (FIR).

21. The apparatus of claim 14, wherein said means for averaging said instant error power over said plurality of incoming QAM symbols in time domain further includes:
a moving averaging filter of length N, wherein N is a number of received symbols selected for averaging purposes, N is an integer.

22. The apparatus of claim 14, wherein said means for averaging said instant error power over said plurality of incoming QAM symbols in time domain further includes:
- a decimation moving averaging filter of length N, said decimation averaging filter utilizes a decimated sequence $\alpha_{N,k,R\ Decimated}$ of received N symbols selected for averaging purposes, wherein said decimated sequence $\alpha_{N,k,R\ Decimated}$ includes a sequence of N symbols selected in the following order: {"k"-th incoming symbol, "k+R"-th incoming symbol, "k+2R"-th incoming symbol, . . . , "k+(N−1)*R"-th incoming symbol}; wherein "k" is an integer less than N; and wherein a decimation rate "R" is an integer less than N; N is an integer.

23. The apparatus of claim 14, wherein said means for translating said averaged error power without said DC component from said time domain into said frequency domain in order to determine the frequency spectrum of said averaged error power further includes:
- a Fast Fourier Transform (FFT) algorithm.

24. The apparatus of claim 14, wherein said means for translating said averaged error power without said DC component from said time domain into said frequency domain in order to determine the frequency spectrum of said averaged error power further includes:
- a Discrete Fourier Transform (DFT) algorithm.

25. The apparatus of claim 14, wherein said means for translating said averaged error power without said DC component from said time domain into said frequency domain in order to determine the frequency spectrum of said averaged error power further includes:
- a wavelet transform algorithm.

26. The apparatus of claim 14, wherein said means for selecting the frequency spectrum component of said averaged error power with the maximum amplitude further includes:
- a peak detector.

27. The apparatus of claim 14, wherein said means for selecting the frequency spectrum component of said averaged error power with the maximum amplitude further includes:
- a maximum likelihood peak detector.

28. The apparatus of claim 14, wherein said means for determining said frequency offset further includes:
- an algorithm configured to determine said frequency offset by selecting a residual maximum frequency component.

* * * * *